United States Patent [19]
Baudin et al.

[11] Patent Number: 5,792,857
[45] Date of Patent: Aug. 11, 1998

[54] SUBSTITUTED DERIVATIVES OF PER (3,6-ANHYDRO) CYCLODEXTRINS, THEIR PREPARATION PROCESS AND THEIR USE FOR SEPARATING IONS

[75] Inventors: Cécile Baudin, Paris; Bruno Perly, La Verriere; Andrée Gadelle, Montbonnot, all of France

[73] Assignee: Commissariat a l'Energie Atomique, Paris, France

[21] Appl. No.: 773,001

[22] Filed: Dec. 23, 1996

[30] Foreign Application Priority Data

Jan. 30, 1996 [FR] France ................. 96 01073

[51] Int. Cl.$^6$ ................. C08B 37/16; C07H 1/00; C07H 1/06
[52] U.S. Cl. ................. 536/103; 536/124
[58] Field of Search ................. 536/103, 124

[56] References Cited

PUBLICATIONS

Yamamura et al, Chemistry Letters (1996), 9, 799–800, 1996.
The Journal of Organic Chemistry, vol. 60, No. 12, pp. 3898–3903, Jun. 16, 1995, Peter Ashton, et al., "A Novel Approach To The Synthesis Of Some Chemically-Modified Cyclodextrins".

Primary Examiner—John Kight
Assistant Examiner—Everett White
Attorney, Agent, or Firm—Oblon, Spivak, McClelland, Maier & Neustadt, P.C.

[57] ABSTRACT

The invention relates to substituted derivatives of per(3,6-anhydro)cyclodextrins, their preparation process and their use for the separation of ions.

These derivatives comply with one of the formulas:

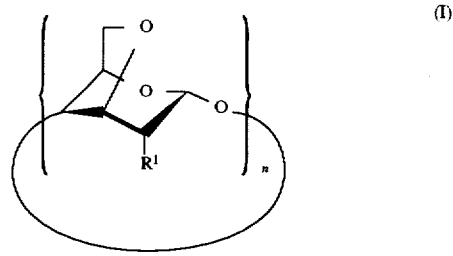

and

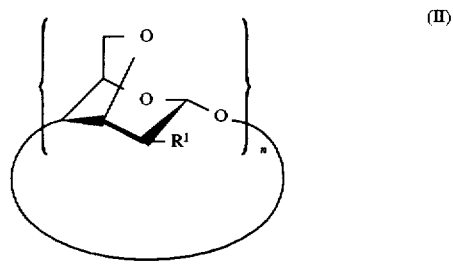

in which the $R^1$, which can be the same or different, represent H, a halogen, OH, $OR_2$, OM, SH, $SR^2$, $OCOR^2$, $NH_2$, $NR^2R^3$, $CONR^2R^3$, $CONH_2$, CN, $COOR^2$, COOH, $OSO_2R^2$, $N_3$ or $R^2$, and n=5, 6 or 7, provided that all the $R^1$ do not represent OH.

19 Claims, 2 Drawing Sheets

SUBSTITUTED DERIVATIVES OF PER (3,6-ANHYDRO) CYCLODEXTRINS, THEIR PREPARATION PROCESS AND THEIR USE FOR SEPARATING IONS

The present invention relates to substituted derivatives of cyclodextrins, more particularly for the selective complexing of ions.

It more specifically relates to the chemical modification of per(3,6-anhydro) cyclodextrins for modifying their properties, particularly their selectivity in the complexing of ions.

Cyclodextrins or cyclomaltooligosaccharides are compounds having a natural origin formed by the linking of α-(1,4)-bound glucose units.

Numerous works have shown that these compounds could form inclusion complexes with hydrophobic molecules, thus permitting their solubilization in aqueous media. Numerous applications have been proposed for taking advantage of this phenomenon, particularly in the pharmaceutical field, as is described by D. Duchêne "Pharmaceutical application of cyclodextrins" in "Cyclodextrins and their industrial uses", D. Duchêne, Editions de Santé, Paris, 1987, pp 213–257.

Pharmaceutical products have already been marketed in Japan, Italy and more recently in France in the form of complexes in cyclodextrins. In France, the first active principle marketed in the form of an inclusion complex in cyclodextrin is piroxicam, which is an anti-inflammatory agent marketed by Pierre Fabre Medicament with the name BREXIN®. Among the very numerous modified derivatives of said cyclodextrins, those for which the cavity is turned back on itself have interesting properties, even though their capacity to include organic molecules is lost or very limited. Compounds of this type are per(3,6-anhydro)cyclodextrins.

The synthesis of peranhydrocyclodextrins was described as from 1991 (Gadelle A. and Defaye J., Angew. Chem. Int. Ed. Engl., (1991), 30, 78–79; Ashton P. R., Ellwood P., Staton I. and Stoddart J. F. Angew. Chem. Int. ed. Engl., (1991) 30, 80–81) and it was demonstrated that these derivatives have interesting solubilities both in water and in organic solvents. Certain subsequent studies (Yamamura H. and Fujita K. Chem. Pharm. Bull., (1991) 39, 2505–2508; Yamamura H., Ezuka T., Kawase Y., Kawai M., Butsugan Y. and Fujita K., J. Chem. Soc., Chem. Com., (1993) 636–637; Yamamura H. Nagaoka H., Kawai M. and Butsugan Y., Tetrahedron Lett. (1995) 36, 1093–1094) have also shown that these peranhydro derivatives could complex ions with a non-negligible selectivity. Ashton et al in J. Org. Chem., 60, 1995, pp 3898–3903 describe the synthesis of a peranhydrocyclodextrin derivative substituted in the 2 position by a methyl group.

However, this chemical modification was not carried out in order to optimize the complexing or selectivity properties of the peranhydrocyclodextrins.

The present invention relates to novel peranhydrocyclodextrin derivatives, in which a chemical modification was made in order to modify their properties, particularly their selectivity with respect to ions which they are able to complex.

According to the invention, this modification relates to the hydroxyl groups present on said molecule, as well as the configuration of carbon $C_2$, which can be reversed to lead to derivatives of the L-mannose type.

According to the invention, the substituted derivative of per(3,6-anhydro) cyclodextrin is in accordance with one of the following formulas:

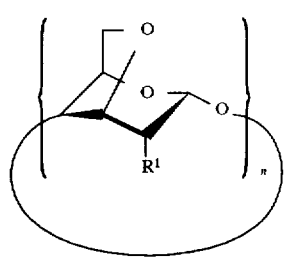

(I)

and

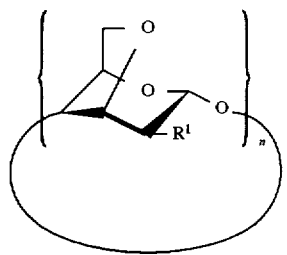

(II)

in which the $R^1$, which can be the same or different, represent a hydrogen atom, a halogen atom, a group complying with one of the formulas: OH, $OR^2$, OM, SH, $SR^2$, $OCOR^2$, $NH_2$, $NR^2R^3$, $CONR^2R^3$, $CO\ NH_2$, CN, $COOR^2$, COOH, $OSO_2R^2$, $N_3$ and $R^2$, in which $R^2$ represents a saturated or unsaturated, aliphatic or aromatic, hydrocarbon group, which can have one or more heteroatoms chosen from among O, S and N, $R^3$ represents a hydrogen atom or a saturated or unsaturated, aliphatic or aromatic, hydrocarbon group, which can have one or more heteroatoms chosen from among O, S and N, and M represents a monovalent cation or a metal, and n is equal to 6, 7, or 8 provided that at least one of the $R^1$ is not the OH group and that $R^1$ is not the methoxy group.

In this derivative, the aliphatic or aromatic hydrocarbon groups which can be used for $R^2$ and $R^3$ can be of different types. They are constituted by a carbon chain in which certain carbon atoms can be replaced by one or more heteroatoms such as O, S and N and they can have one or more ethylene or acetylene nonsaturations. Moreover, the hydrocarbon group can have different substituents, in particular functional groups or halogen atoms. The aromatic hydrocarbon groups can be constituted by the phenyl group and the tosyl group, which can be optionally substituted, e.g. by alkyl groups with 1 to 20 carbon atoms.

According to a first embodiment of the invention, all the $R^1$ represent $OCOR^2$ with $R^2$ representing a straight or branched alkyl group with 1 to 20 carbon atoms, or $OR^2$ with $R^2$ representing a straight or branched alkyl group with 2 to 20 carbon atoms.

According to a second embodiment of the invention, the substituted derivative has at least one $R^1$ group constituted by a starting group such as a halogen atom such as I, Cl, Br or F, a $OSO_2R^2$, $N_3$ or OM group with M having the meaning given hereinbefore.

The derivatives corresponding to this second embodiment of the invention are intermediates, more particularly usable for supplying other substituents, which are not bound by an oxygen atom to the glucose or maltose cycle of the cyclodextrin.

Advantageously, the starting group $R^1$ complies with the formula $OSO_2R^2$ with $R^2$ representing $CF_3$ or

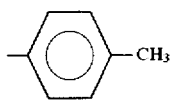

The cyclodextrin derivatives according to the invention can be prepared by different processes.

When the cyclodextrin derivative complies with the above formula (I) or (II), in which at least one of the $R^1$ represents a group of formula $OR^2$ or $OCOR_2$ with $R^2$ having the meaning given hereinbefore, the other $R^1$ representing OH and n being equal to 6, 7, or 8 these can be prepared by a process consisting of reacting a peranhydrocyclodextrin of formula:

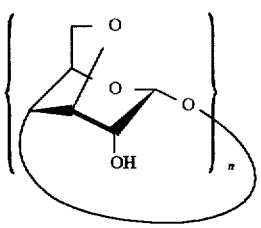
(III)

or

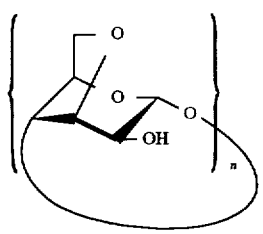
(IV)

in which n is equal to 6, 7, or 8 with a compound of formula $R^2X$, $R^2COX$ or $(R^2CO)_2O$, in which $R^2$ has the meaning given hereinbefore and X represents a halogen atom.

For carrying out this reaction, use is made of the quantity of reagent $R^2X$, $R^2COX$ or $(R^2CO)_2O$ corresponding to the stoichiometric quantity necessary for modifying one or more of the OH groups of the cyclodextrin.

When it is wished to prepare a cyclodextrin derivative in which at least one of the $R^1$ represents a halogen atom or a group of formula SH, $SR^2$, $NH_2$, $NR^2R^3$, $CONR^2R^3$, $CONH_2$, CN, $COOR^2$, COOH, $OSO_2R^2$, $N_3$ or $R^2$, with $R^2$, $R^3$ and M having the meanings given hereinbefore, and n being equal to 6, 7, or 8 the following stages can be performed:

1) reacting a peranhydrocyclodextrin of formula:

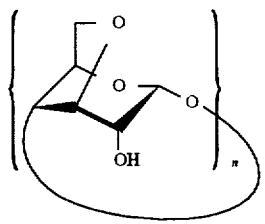
(III)

or

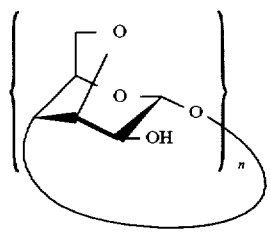
(IV)

in which n is equal to 6, 7 or 8, with an alkali metal hydride for converting the OH group or groups into OM group or groups with M representing an alkali metal;

2) reacting the modified peranhydrocyclodextrin obtained in 1) with a chloride of formula $ClSO_2R^2$ with $R^2$ having the meaning given hereinbefore, in order to obtain the derivative of formula (I) or (II), in which at least one of the $R^1$ is a group of formula $OSO_2R^2$; and 3) when $R^1$ must be different from $OSO_2R^2$, reacting the derivative obtained in the second stage with one or more appropriate reagents for replacing $OSO_2R^2$ by the desired $R^1$ group.

In this process, firstly the per(3,6-anhydro)cyclodextrin is transformed into alcoholate by alkali metal hydride action and then said alcoholate is converted into a derivative having a starting group of formula $OSO_2R^2$, which is then reacted in one or more stages with one or more appropriate reagents for replacing said starting group by the desired $R^1$ group.

Thus, in the case where $R^1$ has to represent $N_3$, it is possible to react $N_3M$ and the compound defined in 2). The thus obtained compound known as an azide can undergo a catalytic hydrogenation or can be treated in the presence of ammonia $NH_3$, so as to obtain the product in which $R^1$ must represent $NH_2$.

The product where $R^1$ must represent $NR^2R^3$ is obtained by reacting the compound defined in 2) with the compound $NHR^2R^3$.

In the case where $R^1$ has to represent a halogen atom X, it is possible to react the compound defined in 2) with $X^-$.

The thus obtained compound ($R^1$=X) can react with $HS^-$ or $R^2S^-$ to give a compound in which $R^1$ will represent SH or $SR^2$.

The compound where R represents a halogen can react with $R_2{}^1LiCu$ ($R^1$ representing a hydrocarbon group) to give a final compound where $R^1$ then represents a hydrocarbon group.

In the same way, the compound where $R^1$ represents a halogen can react with $CN^-$ to give a final compound where R will represent CN.

The compound where $R^1$ represents CN can give by managed hydrolysis a compound where $R^1$ will represent $CONH_2$. The compound where $R^1$ represents CN can give by complete hydrolysis a compound where $R^1$ will represent COOH.

The compound where $R^1$ represents COOH can give by esterification a compound where $R^1$ will represent $COOR^2$.

The compound where $R^1$ represents COOH can react with $NHR^2R^3$ in the presence of DCC (dicyclohexylcarbodiimine) to give a compound where $R^1$ will represent $NR^2R^3$.

For preparing the derivatives of formula (I) or (II), in which at least one of the $R^1$ represents a hydrogen atom, it is possible to subject a peranhydrocyclodextrin of formula (III) or (IV) to a reduction, e.g. by means of $AlLiH_4$ in order to replace the OH groups by H.

To prepare the derivatives of formula (I) or (II), in which at least one of the $R^1$ represents OM, it is possible to react a peranhydrocyclodextrin of formula (III) or (IV) with a metal hydride HM.

The cyclodextrin derivatives according to the invention have numerous advantages. In particular, when they are persubstituted, i.e. when all the $R^1$ are different from the OH group, derivatives are obtained having a good solubility in organic solvents such as chloroform, acetone, tetrahydrofuran, etc. This solubility is of interest for ion separation applications, because it permits the performance of the separation by liquid-liquid exchange processes, which are well known in the art.

Moreover, the possibility of introducing one or more particular chemical groups makes it possible to produce as required complexing agents for very varied ions. This is also amplified by the fact that the three natural cyclodextrins which can be used as the base material have different cavity diameters, which can lead to a supplementary selection with respect to the size of the ions to be separated.

The starting products of formulas (III) or (IV) used in the invention can be prepared by conventional processes, such as those described in the aforementioned articles of Gadelle A. et al and Ashton P. R. et al.

The invention also relates to a process for the separation of ions present in an aqueous solution, which consists of contacting the solution with a cyclodextrin derivative according to the invention in order to complex said ion and separate it from the solution in the form of a cyclodextrin complex.

For obtaining contacting, the cyclodextrin derivative can be dissolved in an organic solvent immiscible with the aqueous solution, e.g. in chloroform.

The ions which can be separated in this way are in particular alkali metal ions, actinides, lanthanides and certain polluting metals such as lead, mercury, cobalt or strontium.

Other features and advantages of the invention can be gathered from reading the following illustrative and non-limitative examples with reference to the attached drawings, wherein show:

FIGS. 1a, 1b, 1c, & 1d Nuclear magnetic resonance (NMR) spectra of the proton of the derivative of example 1 alone (a) or in the presence of 10 mmole/l of NaCl (b), $NH_4Cl$ (c) or KCl (d).

FIG. 2 A NMR spectrum of the proton of the cyclodextrin derivative prepared in example 2.

FIG. 3 A diagrammatic representation of the degree of complexing (in %) of different ions by the starting peranhydrocyclodextrin and the derivative of example 1.

EXAMPLE 1

Synthesis of hexakis(3,6-anhydro-2-O-acetyl)-cyclomaltohexaose

This derivative complies with formula (I), in which all the $R^1$ represent $OCOCH_3$ and n is equal to 6. 200 mg (0.23 mmole) of hexakis(3,6-anhydro) cyclomaltohexaose are dissolved in 2 mL of pyridine and 2 mL of acetic anhydride and heating takes place at 70° C. for 10 hours. The reaction is controlled by NMR-analyzed samples (200 MHz). At the end of the reaction, the solvent is evaporated and the residue dissolved in water and is then filtered. The product is chromatographed on a µ-Bondapack $C_{18}$ column using a methanol-water (50:50) mixture and is characterized by mass spectrometry and NMR. Its solubilities are 39 mmole/L in water and 51 mmole/L in $CHCl_3$ at 25° C.

A comparison of the spectra of FIGS. 1a, 1b, 1c, and 1d shows a significant complexing selectivity of potassium, particularly with respect to sodium. This selectivity is deduced from the chemical displacement variations observed in the presence of the different salts.

EXAMPLE 2

Synthesis of mono-2-tosyl-3,6-anhydrocyclomaltohexaose

This compound complies with formula (I), in which a single $R^1$ represents

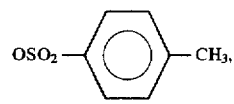

the other $R^1$ representing OH and n=6.

300 mg (0.342 mmole) of lyophilized hexakis (3,6-anhydro)cyclomaltohexaose are dispersed in 80 mL of dry dimethylformamide (DMF) at 70° C. for 15 minutes. The solution is cooled to ambient temperature, sampled with the syringe and then added to 43 mg of sodium hydride (NaH) dispersed in oil. The solution becomes clears after 20 minutes stirring. The tosyl chloride (65.2 mg, i.e. 0.342 mmole) diluted in 3 mL of dry DMF is then added with the aid of a syringe to the preceding solution. The solvent is evaporated and the crude product chromatographed in HPLC on a µ-Bondapack $C_{18}$ column using an elution gradient of 0 to 100% of methanol in water (semi-preparative column). The methanol solution is sampled at the retention time of 34 minutes. The product is characterized by mass spectrometry and NMR.

Figure 1:
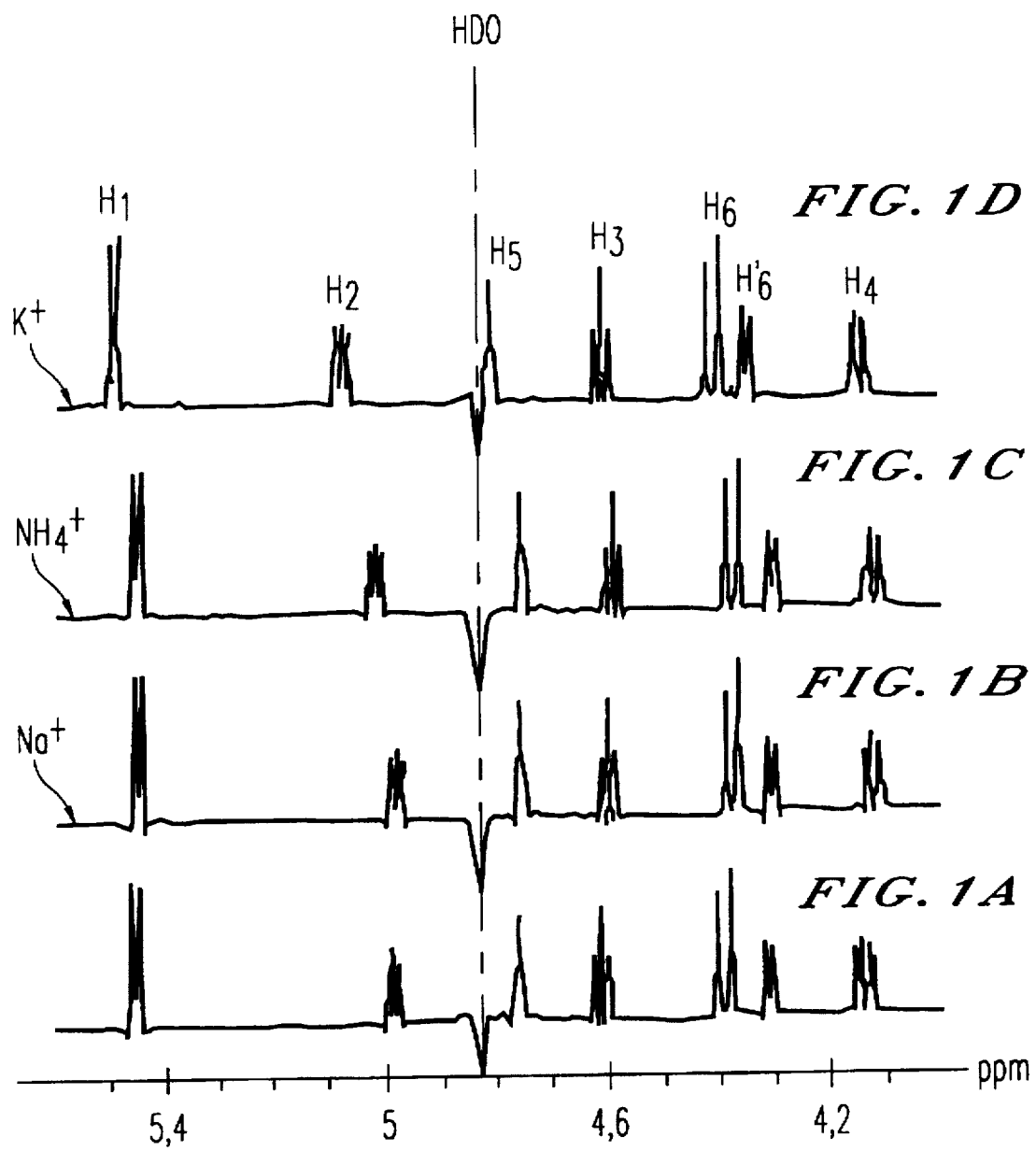
FIG. 1(a) illustrates the partial $^1H$ NMR spectrum (500 MHz, 298K) in $D_2O$ of the compound at a concentration of 3 mmole/L.
FIG. 1(b) illustrates the partial $^1H$ NMR spectrum of the compound under the same conditions, in the presence of 10 mmole/L of sodium chloride.
FIG. 1(c) illustrates the partial $^1H$ NMR spectrum in $D_2O$ of the compound, under the same conditions and in the presence of 10 mmole/L of $NH_4Cl$.
FIG. 1(d) illustrates the partial $^1H$ NMR spectrum of the compound under the same conditions, in the presence of 10 mmole/L of potassium chloride.
Figure 2:
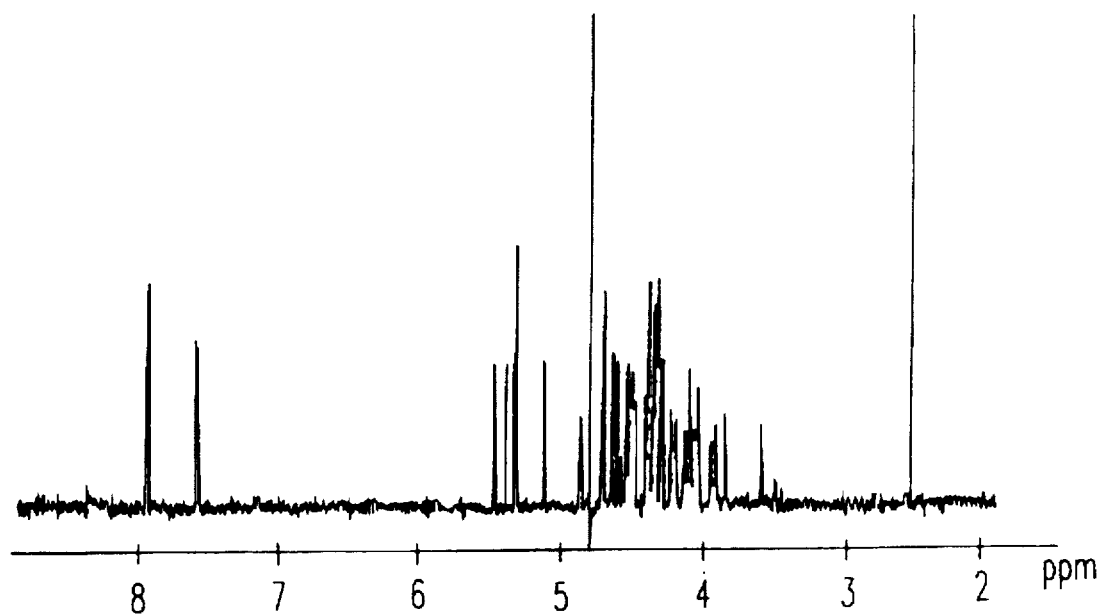

FIG. 2 illustrates the H MNR spectrum (500 MHz, 303 K) in $D_2O$ of mono-2-tosyl-hexakis(3,6-anhydro) cyclomaltohexaose. This spectrum was totally attributed to ID and 2D NMR and indicates a purity better than 99%. The digital integration of the signals of the aromatic protons of the tosyl group and the anomeric protons confirms the monosubstitution.

EXAMPLE 3

Revealing the complexing of the ions by the compound of example 1 using ion exchange plate chromatography The use of chromatographic plates on ion-charged films permits a rapid evaluation of the complexing of these ions by the species to be evaluated. In the present case use was made of Polygram Ionex 25-SA-Na plates (Macherey-Nagel, ref: 80613) charged with various counterions. Use was made of chromatographic plates on which are respectively fixed the ions $Li^+$, $Na^+$, $K^+$, $Cs^+$, $NH_4^+$, $Pb^{2+}$, $Hg^{2+}$, $Sr^{2+}$, $Co^{2+}$, $Dy^{3+}$.

In each test, onto the plate was introduced the compound of example 1 which, if it complexes ions, will be retained on the plate. The plates were then developed four times in water, due to the limited migration of the cyclodextrin derivatives, followed by a determination of the degree of complexing (in %) by the formula (1−Rf)×100, in which Rf represents the ratio distance covered by the cyclodextrin derivative:distance covered by the solvent. The results obtained are given in FIG. 3 (blank columns).

Figure 3:
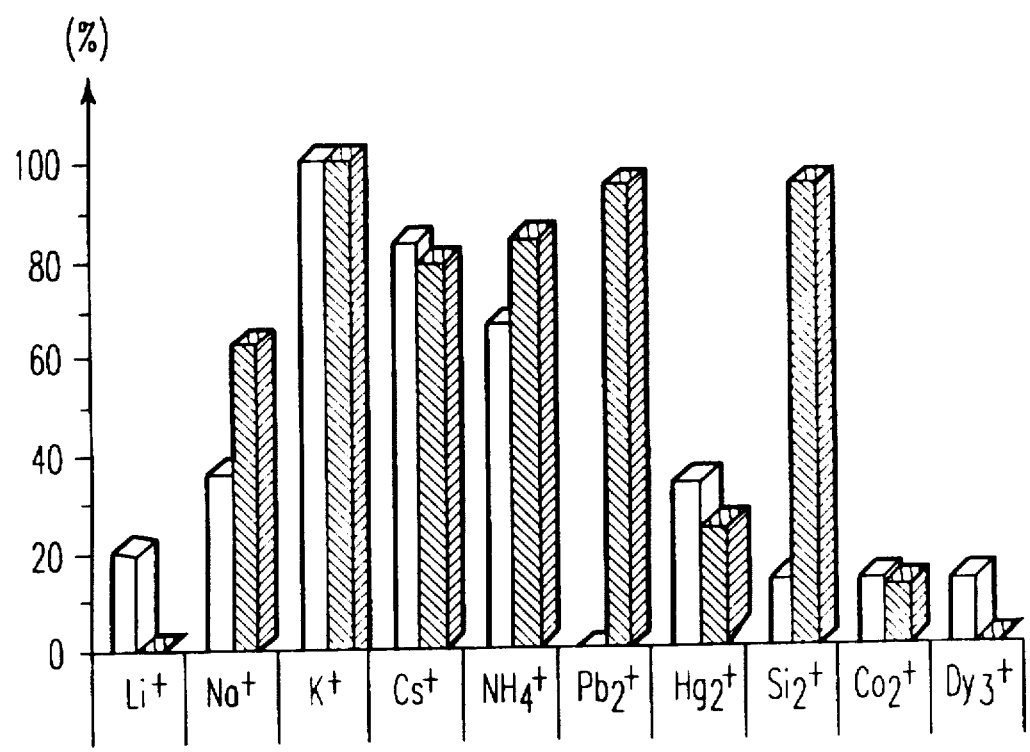

For comparison purposes, FIG. 3 gives the results (grey columns) obtained under the same conditions with the unsubstituted derivative: hexakis(3,6-anhydro) cyclomaltohexaose.

Thus, in the series of alkaline ions, the two compounds have a high selectivity for potassium and cesium. The ammonium ion is also complexed by these two compounds. These results are in perfect agreement with the preceding data obtained by NMR. However, the complexing of the $Co^{2+}$ and $Dy^{3+}$ ions is very modest. One particularly important aspect relates to the comparison of the complexing of lead and mercury. A remarkable selectivity modification observed with respect to these two metals on comparing the two derivatives tested. This observation is of vital importance for potential human decontamination applications.

Thus, the substituted derivatives according to the invention are of great interest for numerous applications. Thus, by appropriately choosing the substituents, it is possible to give them a complexing selectivity relative to certain ions compared with other ions, which leads to interesting applications, e.g. in the medical field for human decontamination, or for the separation of actinides and lanthanides.

We claim:

1. Substituted derivative of per(3,6-anhydro)cyclodextrin complying with one of the following formulas:

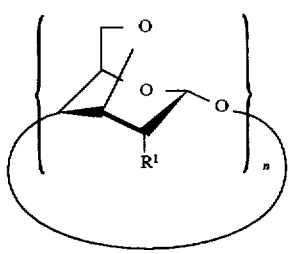

(I)

and

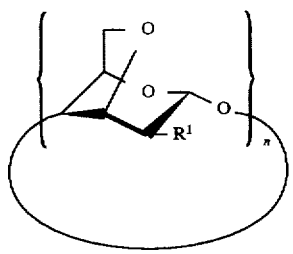

(II)

in which the $R^1$, which can be the same or different, represent a hydrogen atom, a halogen atom, a group complying with one of the formulas: OH, $OR^2$, OM, SH, $SR^2$, $OCOR^2$, $NH_2$, $NR^2R^3$, $CONR^2R^3$, $CO\ NH_2$, CN, $COOR^2$, COOH, $OSO_2R^2$, $N_3$ and $R^2$, in which $R^2$ represents a saturated or unsaturated, aliphatic or aromatic, hydrocarbon group, which can have one or more heteroatoms chosen from among O, S and N, $R^3$ represents a hydrogen atom or a saturated or unsaturated, aliphatic or aromatic, hydrocarbon group, which can have one or more heteroatoms chosen from among O, S and N, and M represents a monovalent cation or a metal, and n is equal to 6, 7, or 8 provided that at least one of the $R^1$ is not the OH group and that $R^1$ is not the methoxy group.

2. Derivative according to claim 1, wherein all the $R^1$ represent $OCOR^2$ with $R^2$ representing a straight or branched alkyl group with 1 to 20 carbon atoms, or $OR^2$ with $R^2$ representing a straight or branched alkyl group with 2 to 20 carbon atoms.

3. Derivative according to claim 2, having formula (I), in which n is equal to 6 and all the $R^1$ represent $OCOCH_3$.

4. Derivative according to claim 1, wherein at least one of the $R^1$ represents $OSO_2R^2$, a halogen atom, $N_3$ or OM.

5. Derivative according to claim 4, wherein at least one of the $R^1$ represents $OSO_2R^2$ with $R^2$ representing $CF_3$ or

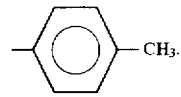

6. Derivative according to claim 5, having formula (I), in which one of the $R^1$ represents

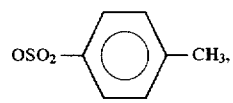

the other $R^1$ representing OH and n is equal to 6.

7. The derivative according to claim 1, wherein n is 6.

8. The derivative according to claim 1, wherein n is 7.

9. The derivative according to claim 1, wherein n is 8.

10. The derivative of claim 1, wherein $R^2$ represents a saturated or unsaturated aliphatic or aromatic hydrocarbon group which optionally has one or more heteroatoms selected from the group consisting of O and S.

11. The derivative of claim 10, wherein $R^2$ represents a saturated or unsaturated aliphatic hydrocarbon group which optionally has one or more heteroatoms selected from the group consisting of O, S and N.

12. The derivative of claim 10, wherein $R^2$ represents a saturated or unsaturated aliphatic hydrocarbon group.

13. Process for the preparation of a derivative complying with one of the formulas (I) and (II) as defined in claim 1:

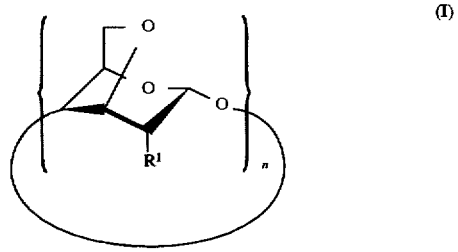

(I)

and

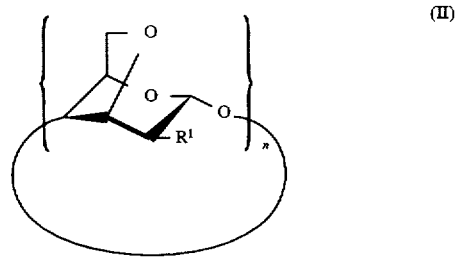

(II)

in which at least one of the $R^1$ represents a group of formula $OR^2$ or $OCOR^2$ with $R^2$ having the meaning given in claim 1, the other $R^1$ representing OH and n is equal to 6, 7 or 8 comprising reacting a peranhydrocyclodextrin of formula:

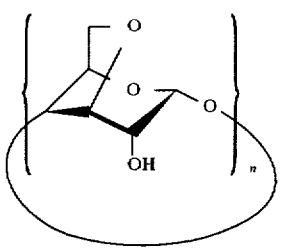

(III)

or

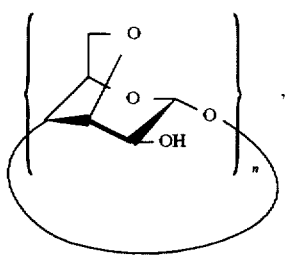

(IV)

in which n is equal to 6, 7 or 8, with a compound of formula $R^2X$, $R^2COX$ or $(R^2CO)_2O$, in which $R^2$ has the meaning given hereinbefore and $X$ represents a halogen atom.

14. Process for the preparation of a derivative complying with one of the formulas (I) or (II) as defined in claim 1:

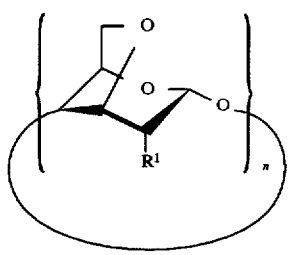

(I)

and

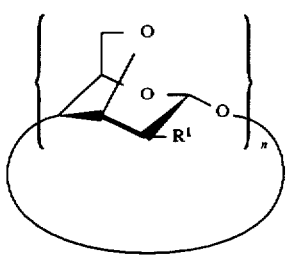

(II)

in which, at least one of the $R^1$ represents a halogen atom or a group of formula SH, $SR^2$, $NH_2$, $NR^2R^3$, $CONR^2R^3$, $CONH_2$, CN, $COOR^2$, COOH, $OSO_2R^2$, $N_3$ or $R^2$, with $R^2$, $R^3$ and M having the meanings given in claim 1, the other $R^1$ representing OH and n is equal to 6, 7 or 8, comprising:

1) reacting a peranhydrocyclodextrin of formula:

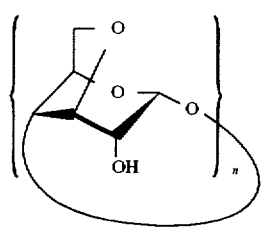

(III)

or

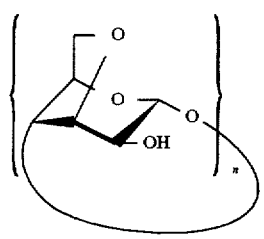

(IV)

in which n is equal to 6, 7 or 8, with an alkali metal hydride in order to convert the OH group or groups into OM group or groups with M representing an alkali metal, 2) reacting the modified peranhydrocyclodextrin obtained in 1) with a chloride of formula $ClOSO_2R^2$ with $R^2$ having the meaning given in claim 1, to obtain the derivative of formula (I) or (II), in which at least one of the $R^1$ is a group of formula $OSO_2R^2$ and 3) when $R^1$ has to be different from $OSO_2R^2$, reacting the derivative obtained in the second stage with one or more appropriate reagents for replacing $OSO_2R^2$ by the desired $R^1$ group.

15. Process for the separation of the ions present in an aqueous solution, comprising contacting the solution with a cyclodextrin derivative according to claim 1, to complex said ions and separating said ions from the solution in the form of a cyclodextrin complex.

16. Process according to claim 15, wherein the cyclodextrin derivative is dissolved in an organic solvent immiscible with the aqueous solution.

17. Process according to claim 15, wherein the ions to be separated are chosen from among alkali metal ions, actinides and lanthanides.

18. Process according to claim 17, wherein the cyclodextrin derivative complies with formula (I), in which n is equal to 6 and all the $R^1$ represent $OCOCH_3$.

19. Process according to claim 15, wherein the cyclodextrin derivative complies with formula (I) in which n is equal to 6 and all the $R^1$ represent $OCOCH_3$.

* * * * *